(12) United States Patent
Marshall

(10) Patent No.: US 6,485,156 B1
(45) Date of Patent: Nov. 26, 2002

(54) TRUNK MOUNTED MIRROR

(76) Inventor: Alice Marshall, 4221 Fountain Palm Rd., Cocoa, FL (US) 32926

( * ) Notice: Subject to any disclaimer, the term of this patent is extended or adjusted under 35 U.S.C. 154(b) by 0 days.

(21) Appl. No.: 09/880,683

(22) Filed: Jun. 13, 2001

Related U.S. Application Data

(60) Provisional application No. 60/211,755, filed on Jun. 14, 2000.

(51) Int. Cl.⁷ ................................................. G02B 7/182
(52) U.S. Cl. ........................ 359/879; 359/880; 359/838; 359/839
(58) Field of Search ................. 359/879, 880, 359/838, 839, 866, 850, 871, 872, 881

(56) References Cited

U.S. PATENT DOCUMENTS

| | | | |
|---|---|---|---|
| 3,749,440 A | * 7/1973 | Lathers | 296/51 |
| 3,943,351 A | * 3/1976 | Nilsson | 240/7.1 R |
| 4,436,372 A | * 3/1984 | Schmidt et al. | 350/293 |
| 4,486,075 A | * 12/1984 | Cohen | 350/603 |
| 4,917,485 A | 4/1990 | Baldwin, Sr. | |
| 4,964,712 A | 10/1990 | Anderson | |
| 5,084,785 A | 1/1992 | Albers et al. | |
| 5,106,177 A | 4/1992 | Dolasia | |
| 5,488,515 A | 1/1996 | Rachels, Sr. | |
| 5,762,245 A | 6/1998 | Hurst | |
| 5,949,595 A | 9/1999 | Kissinger | |

* cited by examiner

*Primary Examiner*—Mohammad Sikder
(74) *Attorney, Agent, or Firm*—Saliwanchik Lloyd & Saliwanchik

(57) ABSTRACT

The subject invention pertains to materials and methods that provide a person conducting activity at the rear of a vehicle, such as when loading items into the trunk of a car or the rear of a van the opportunity to observe the area immediately to the rear and rear sides of the vehicle without turning around and facing in that direction. One embodiment concerns a mirror or other reflective material adapted for mounting inside a trunk or rear of a van to permit a user to observe behind them at the same time that they are facing toward the open trunk or van hatchback.

21 Claims, 4 Drawing Sheets

TRUNK MOUNTED MIRROR

CROSS-REFERENCE TO A RELATED APPLICATION

This application claims the benefit of U.S. Provisional Application No. 60/211,755, filed Jun. 14, 2000.

BACKGROUND OF THE INVENTION

There is a growing societal problem of kidnappers and car-jackers in addition to robberies and assaults. There have been numerous instances where children were abducted in broad daylight while their parents were placing items into the trunk of their cars or the back of their vans. When they finished loading their parcels into the car or van trunk, they turned around and discovered that their children were gone. There have also been reports of kidnappings and assaults of adults who were placing items in the trunk of their cars, or removing something out of the trunk of their car, and did not observe a stranger or drunkard approaching from behind who could pose a safety hazard.

Criminologists generally agree that one of the most under-appreciated crime prevention techniques is simply to remain alert to your surroundings. The main objective is to avoid becoming distracted or preoccupied and to make quick eye contact with those around you, conveying the message that you are aware and mindful of their presence.

Although there are numerous descriptions of mirrors mounted on the side or interior of a vehicle, these are all intended for utilization by the individual seated in the driver's seat, positioned primarily to allow the driver to observe traffic behind their vehicle. Examples of these mirrors are described in U.S. Pat. Nos. 5,949,595; 4,964,712; 5,488,515; and 5,084,785.

As can be understood from the above, there remains a need for persons to be able to view the area behind them where they are working or conducting activities at the rear of a vehicle.

BRIEF DESCRIPTION OF THE INVENTION

The subject invention pertains to materials and methods that provide a person (user) standing or loading items into the trunk of a car or rear of a van, or conducting other activities at the rear of the vehicle, the opportunity to observe the area immediately to the rear and rear sides of the vehicle while the user is facing generally toward the front of the vehicle. In one embodiment, a mirror or other reflective material is adapted for mounting inside a trunk or rear of a van to permit a user to observe behind them at the same time that they are facing toward the open trunk or van hatchback. Another embodiment provides a trunk or van hatch with a mirror or other reflective material incorporated into the trunk or hatch so as to allow the user to observe behind them.

By allowing for a person to conduct activities at the rear of the vehicle in a confident manner, it decreases the likelihood of the person being a target of criminal activity. When a stranger is spotted in the mirror approaching from behind, the user of the present invention may turn around for a face-to-face confrontation or take other actions or precautions as the situation warrants. This would likely deter a sneak-up attack since the appearance of a would-be offender has already been determined. The would-be criminal may choose to move on if the element of surprise is eliminated.

DETAILED DESCRIPTION OF THE INVENTION

The subject invention pertains to materials and methods that provide a person (user) standing or loading items into the trunk of a car or rear of a van, or conducting other activities at the rear of the vehicle, the opportunity to observe the area immediately to the rear and rear sides of the vehicle while the user is facing generally toward the front of the vehicle. In one embodiment, the present invention concerns a rear mounted viewing device comprising a mirror for vehicles designed to aid a person in viewing or observing strangers or criminals approaching from behind. The subject invention enables a person to safely stand at the rear of a vehicle and load or unload a car trunk, or a van or sports utility vehicle cargo space while decreasing the chance that a person could sneak up from behind while the person is conducting activity at the rear of the vehicle. Thus, the present invention is useful in deterring or reducing the likelihood of assault, carjackings, child kidnappings, theft and other crimes from occurring while a person is working at the rear of a vehicle.

Figure 1:
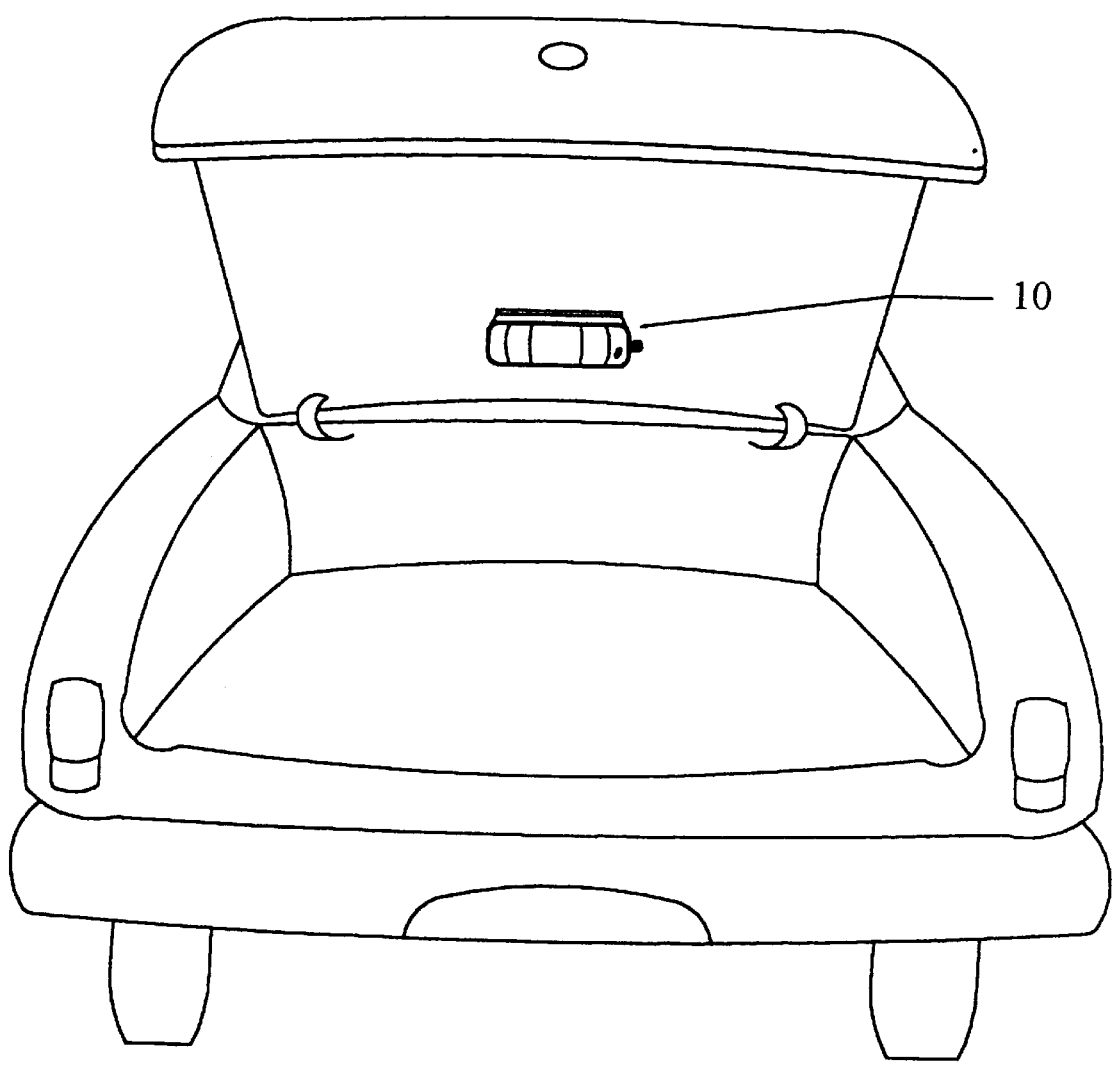
FIG. 1 shows a frontal view of one embodiment of the invention mounted on the inside of an automobile trunk lid.
Figure 2:
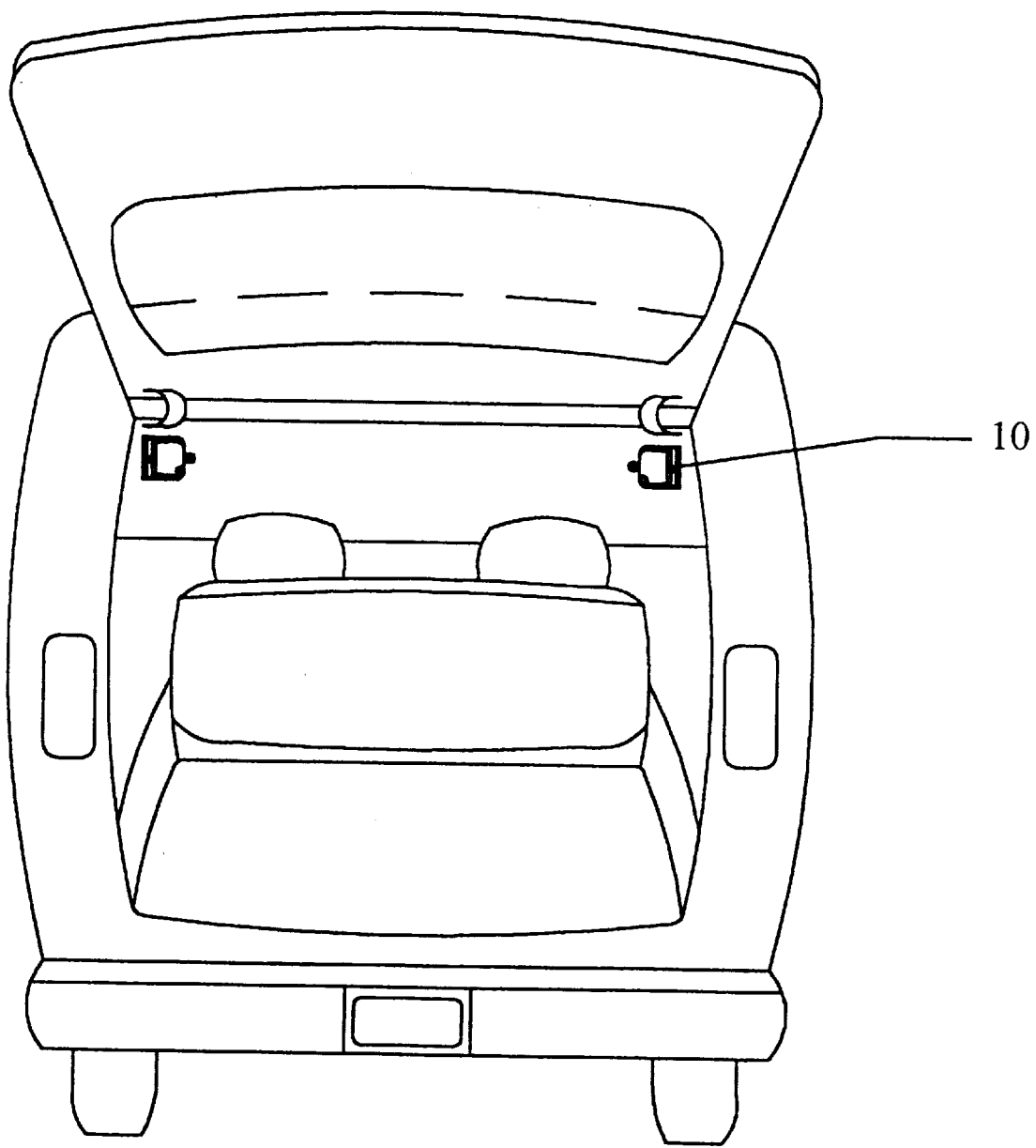
FIG. 2 shows a frontal view of one embodiment of the invention mounted on the inside of a van or SUV hatch.

The viewing device is preferably mounted on or adjacent to an inside surface on a rear opening fixture of the vehicle, such as a trunk lid, hitch door, or tailgate. In one embodiment, the device is adapted for mounting inside a vehicle trunk or hatch. Preferably, the mirror of the subject invention is convex and can be installed at the inside of the trunk lid near the lower center, as shown in FIG. 1. In a van or sports utility vehicle, the viewing device is preferably placed in the ceiling over the rear seat, as shown in FIG. 2. This would position the device in front of a user standing at the rear of the vehicle facing the open trunk or hatch. In the case of a van or sports utility vehicle with rear doors, the device could also be applied to the rear ceiling.

In one embodiment of the invention, the mirror of the device is readily exposed for use when the user opens the trunk or the rear doors of a vehicle. The person can periodically look into the mirror while conducting activity at the rear of the vehicle, such as when loading or unloading the cargo space of the vehicle. This makes it easier for the person to detect a stranger or possible criminal approaching from behind. The person would be better prepared to interrupt a surprise attack with the advanced visual warning. The subject invention provides a measure of safety and peace of mind to people who might otherwise be caught off guard.

The subject viewing device can be mounted by new car, van and sports utility vehicles manufacturers as original or standard equipment. It can also be made available in an aftermarket kit form for installation by individual purchasers. Preferably, the device is lightweight, affordable and adaptable to a wide variety of cars, vans and sports utility vehicles.

Figure 3:
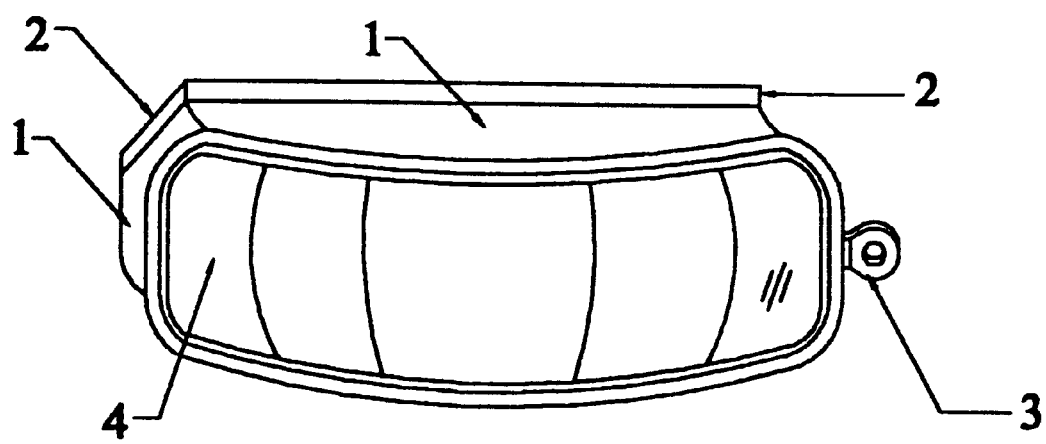
FIG. 3 shows an orthographic view of one embodiment of the invention wherein the mirror is adapted for mounting on the inside of an automobile trunk lid.
Figure 4:
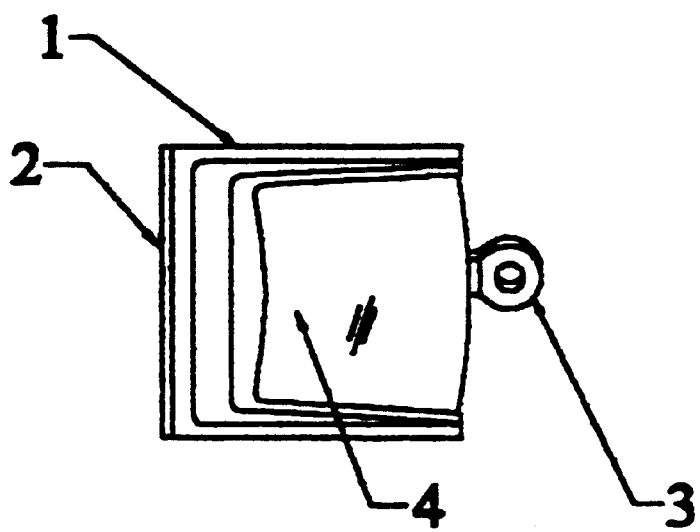
FIG. 4 shows a frontal view of one embodiment of the invention wherein the mirror is adapted for mounting on the inside of a van or SUV hatch.

In one embodiment of the invention, the viewing device 10 comprises a mirror frame 1 which can be made of a durable material such as plastic, e.g., injection-molded polypropylene, polyethylene or high density polyethylene. Other materials, such as aluminum and steel, are also contemplated. A mirror 4 is mounted in mirror frame 1. The mirror 4 itself can be made of mold-injected acrylic or plexiglass with a reflective silver or chromium film applied. In a preferred embodiment, the mirror 4 is convex, as shown in FIGS. 3 and 4, so as to afford the user with a wide-angle view of what is going on behind them without having to turn around. Other suitable mirrors known in the art are contemplated for use with the present invention. It is contemplated, for example, that the mirror 4 may be sectional, having multiple mirrored sections. The sections may be of different sizes, orientations and curvatures in order to provide a more widened or comprehensive view behind, and peripheral to, the user.

The mirror frame 1 of the subject invention can have one or more securing means 2 for securing the subject invention to one or more surfaces within the vehicle. The securing means 2 may be, for example, an adhesive or magnet, depending upon the ferrous content of the surface that the subject invention is to be secured to. The securing means 2 may function in a temporary or permanent fashion, and may even be integral to the paneling of the vehicle's interior. Other suitable securing means include clips, clamps, pegs, hook and loop fasteners, nut and bolt fasteners, screw fasteners, rivets, straps, springs, brackets or suction cups. In addition, the securing means may include a hinge or ball and socket joint to permit flexibility in the orientation of the mirror frame. The following U.S. patents disclose various means for securing mirrors in vehicles which may be appropriate: U.S. Pat. Nos. 5,106,177; 5,488,515; 5,949,595; and 4,917,485.

Figure 5A:
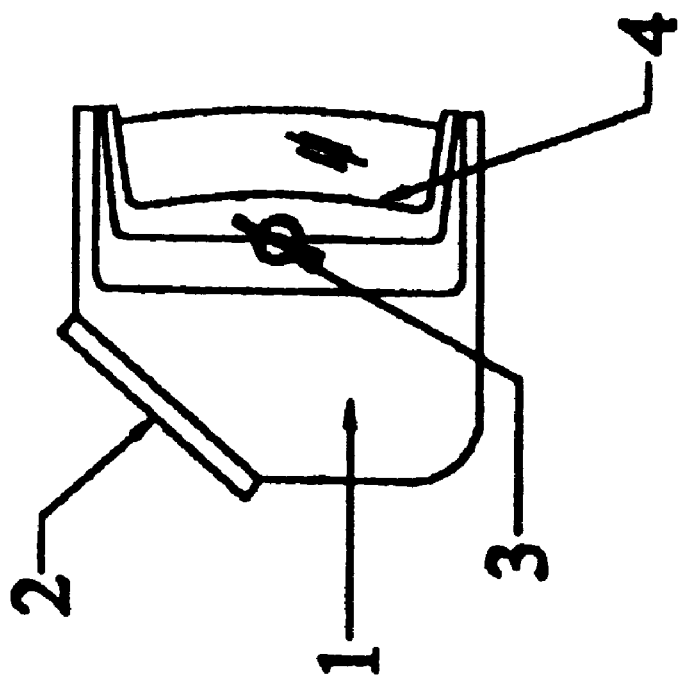
FIGS. 5A–B shows a side view of one embodiment of the invention wherein the mirror is pivotally mounted within the mirror frame.
Figure 5B:
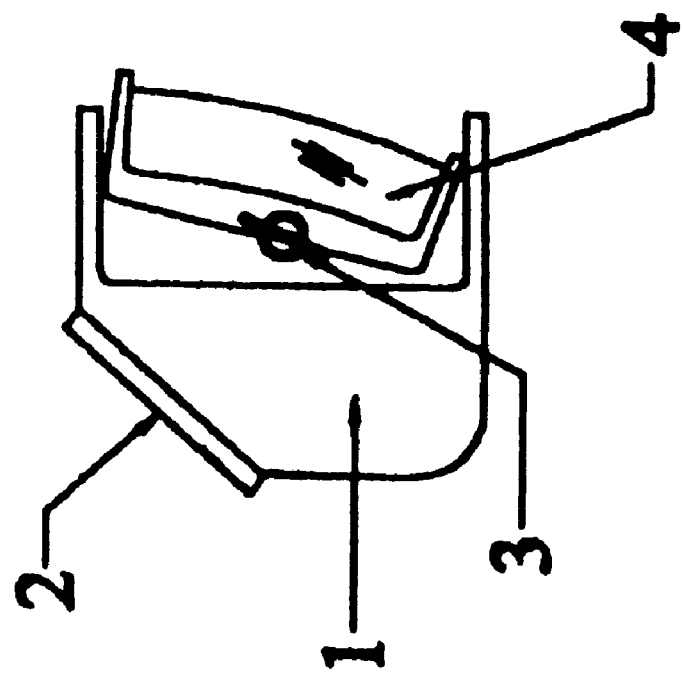

In another embodiment, a pivoting means permits the mirror 4 to pivot within the frame 1, as shown in FIGS. 5A–B, to optimize the field of view for the particular observer. Suitable pivoting means which permit movement of vehicle mirrors in various directions are well known in the art. Pivoting means may include, for example, a hinge or ball and socket joint. As shown in FIGS. 5A–B, this embodiment of the subject invention may include a pivot lock, such as a tightening screw 3, which functions to fix the mirror 4 in a desired position. Alternatively, the pivoting means may have the ability to retain the mirror 4 in a desired position without the necessity of a pivot lock 3.

It is also contemplated that a light source may be included within the mirror frame 1, or entirely separate from it. The light source would aid the user of the present invention in visualizing images in the mirror 4 at night or in poorly lit public garages. The light source may be of sufficient intensity and orientation to light the area immediately behind the vehicle and the user, as well. The light source may be triggered by opening the vehicle trunk or hatch. Alternatively, a motion-sensing device can be mounted on the vehicle trunk lid or hatch such that the light source is triggered only when there is movement behind the user. Motion sensing devices are known in the art.

As shown in FIG. 1, in one embodiment, the device of the subject invention will mount in the trunk of a vehicle, on the trunk lid, so that while the user is placing items in the trunk of the vehicle or generally conducting some activity at the rear of the vehicle, he or she will be able to observe anyone approaching from the rear or periphery of the vehicle. The user will be able to be aware of his or her surroundings merely by looking into the subject invention. For example, the user will be able to keep an eye on a child sitting safely in the grocery cart. If the user is a young person, an elderly person or a parent with children in a parking lot, he or she will be able to use the subject invention to see the approach of a stranger or others. As shown in FIG. 2, the subject invention can also be used in the rear of a van or sports utility vehicle. In a preferred embodiment, the surface of the mirror describes a convex curve, such that merely by moving his or her head or eyes slightly, the user is provided with a panoramic view of the area around and behind the user.

In one embodiment, the mirror frame 1 occupies one of two positions, a traveling position and an operative position, depending upon the status of the trunk lid or hatch, i.e., closed or opened, respectively. The securing means 2 of the mirror frame 1 provides the flexibility to cooperate with the interior structure of the trunk lid such that, when the trunk lid is closed, the mirror frame 1 is in a stowed or traveling position wherein the mirror frame 1 does not significantly intrude into the cargo space of the trunk. Conversely, when the trunk lid is in an open position, the mirror frame 1 is shifted from its traveling position to its operative position. In its operative position, the mirror frame 1 and mirror 4 are oriented to provide an individual located at the rear of the vehicle facing the open trunk or hatch area with a view of the area behind and to the side of the individual. This cooperation between the mirror frame 1 and the trunk lid may be achieved, for example, by the operation of a hinge and folded elements, as disclosed U.S. Pat. No. 5,762,245, which teaches a folding trunk tray.

The subject invention also concerns a vehicle trunk lid, hatch door or roof area comprising a viewing device mounted on the inside of the lid or door such that when the lid or door is opened the mirror is positioned in a manner to allow the user to observe behind him while facing toward the open trunk or cargo space.

The subject invention also concerns a vehicle, such as an automobile, van or sports utility vehicle (SUV), which comprises a viewing device of the present invention mounted or otherwise provided at the rear of the vehicle such that a person conducting activity at the rear of the vehicle allows that person to observe the area to the rear and rear sides of the vehicle while the person is facing the rear of the vehicle, such as when the trunk or hatch is open.

It should be understood from the disclosure herein, that the placement and orientation of the subject invention within the vehicle may be optimized for the height of a particular viewer. For example, a particular viewer may be of shorter than average height, a child, or confined to a wheelchair, requiring the subject invention to be located and oriented within the vehicle such that the user is provided with a view of the area around them when located at the rear of the vehicle, facing the open trunk. In addition, the orientation of the mirror 4 may be mechanically actuated for remote operation, for example, from the vehicle's console. Further, the mechanically actuated mirror's orientation may be programmed such that particular orientations, depending upon the height of a particular viewer, are placed within the memory of an onboard computer. These orientations may then be actuated at the touch of a button.

The subject invention also concerns methods for allowing a person to be able to observe behind them while facing towards an open trunk or hatch door of a car, van or SUV by providing a mirror, trunk lid or hatch door of the present invention.

All patents, patent applications, provisional applications, and publications referred to or cited herein are incorporated by reference in their entirety to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims.

I claim:

1. A rear opening fixture of a vehicle which comprises at least one viewing device attached to an inside surface on the rear opening fixture such that when the rear opening fixture of the vehicle is opened, a user standing or conducting activity at the rear end of the vehicle can observe a rearward view while the user is facing generally toward the front of the vehicle, wherein said viewing device comprises a mirror and a securing means for securing said viewing device to said rear opening fixture.

2. The rear opening fixture according to claim 1, wherein said rear opening fixture is selected from the group consisting of a trunk lid, hatch door, and tailgate of the vehicle.

3. The rear opening fixture according to claim 1, wherein said mirror comprises a convex curved surface providing a panoramic rearward view to the user.

4. The rear opening fixture according to claim 3, wherein said convex curved surface is composed of multiple mirrored sections.

5. The rear opening fixture according to claim 3, wherein said mirror is mounted in a mirror frame made of a material selected from the group consisting of plastic, injection-molded polypropylene, polyethylene, high density polyethylene, aluminum, and steel.

6. The rear opening fixture according to claim 5, wherein said mirror further comprises a pivoting means to permit said mirror to pivot within said mirror frame.

7. The rear opening fixture according to claim 1, wherein said viewing device can occupy either of two positions, a traveling position and an operative position, wherein said traveling position of said viewing device is achieved when said rear opening fixture is closed and said operative position is achieved when said rear opening fixture is opened, wherein in the operative position a user standing or conducting activity at the rear end of the vehicle can observe a rearward view while the user is facing generally toward the front of the vehicle.

8. The rear opening fixture according to claim 1, wherein said viewing device further comprises a light source.

9. The rear opening fixture according to claim 8, wherein said light source is triggered by opening of said rear opening fixture.

10. A vehicle having a rear opening fixture, said vehicle comprising at least one viewing device attached to an inside surface on said rear opening fixture such that when said rear opening fixture of the vehicle is opened, a user standing or conducting activity at the rear of the vehicle can observe the areas to the rear and rear sides of the user while the user is generally facing the front of the vehicle, wherein said viewing device comprises a mirror and a securing means for securing said viewing device to said rear opening fixture.

11. The vehicle according to claim 10, wherein said inside surface is an interior roof area.

12. The vehicle according to claim 11, wherein said inside surface is on said rear opening fixture.

13. The vehicle according to claim 10, wherein said rear opening fixture is selected from the group consisting of a trunk lid, hatch door, and tailgate.

14. The vehicle according to claim 10, wherein said mirror comprises a convex curved surface providing a panoramic rearward view to the user.

15. The vehicle according to claim 14, wherein said convex curved surface is composed of multiple mirrored sections.

16. The vehicle according to claim 10, wherein said mirror is mounted in a mirror frame made of a material selected from the group consisting of plastic, injection-molded poly propylene, polyethylene, high density polyethylene, aluminum, and steel.

17. The vehicle according to claim 10, wherein said mirror further comprises a pivoting means to permit said mirror to pivot within said mirror frame.

18. The vehicle according to claim 10, wherein said securing means is attached to a mirror frame to mount said viewing device to one or more surfaces within the vehicle.

19. The vehicle according to claim 10, wherein said viewing device can occupy either of two positions, a traveling position and an operative position, wherein said traveling position of said viewing device is achieved when said rear opening fixture is closed and said operative position is achieved when said rear opening fixture is opened, wherein in the operative position a user standing or conducting activity at the rear end of the vehicle can observe a rearward view while the user is facing generally toward the front of the vehicle.

20. The vehicle according to claim 10, wherein said viewing device further comprises a light source.

21. The vehicle according to claim 20, wherein said light source is triggered by opening of the rear opening fixture.

* * * * *